United States Patent [19]

Neumann

[11] 4,289,026

[45] Sep. 15, 1981

[54] LEVEL INDICATING DEVICE

[75] Inventor: Jürgen Neumann, Liederbach, Fed. Rep. of Germany

[73] Assignee: Hoechst Aktiengesellschaft, Frankfurt, Fed. Rep. of Germany

[21] Appl. No.: 79,932

[22] Filed: Sep. 28, 1979

[30] Foreign Application Priority Data

Oct. 9, 1978 [DE] Fed. Rep. of Germany ....... 2843937

[51] Int. Cl.³ ...................... G01F 23/00; G03G 15/08
[52] U.S. Cl. ................................ 73/290 R; 200/61.04;
200/61.20; 200/85 R; 222/64; 222/DIG. 1
[58] Field of Search .................. 73/343 B; 222/64, 56,
222/DIG. 1; 200/61.04, 61.20

[56] References Cited

U.S. PATENT DOCUMENTS

| | | | |
|---|---|---|---|
| 3,253,741 | 5/1966 | Russell et al. | 222/64 X |
| 3,572,555 | 3/1971 | Knight | 222/DIG. 1 |
| 3,588,521 | 6/1971 | Stone | 222/64 X |
| 3,643,629 | 2/1972 | Kangas et al. | 335/303 X |

FOREIGN PATENT DOCUMENTS

| | | | |
|---|---|---|---|
| 0275573 | 1/1964 | Australia | 222/64 |
| 2053141 | 2/1973 | Fed. Rep. of Germany | 222/64 |
| 1302687 | 1/1973 | United Kingdom | 222/64 |

Primary Examiner—Daniel M. Yasich
Attorney, Agent, or Firm—Schwartz, Jeffery, Schwaab, Mack, Blumenthal & Koch

[57] ABSTRACT

Disclosed is a device for indicating that the level of a dosable material has fallen below a predetermined level in a dosing container having a shaft mounted horizontally for rotation inside of the container and a dosing brush mounted on the shaft. This device comprises an elastic contact tongue radially fixed to the shaft for rotation therewith, the contact tongue being sufficiently elastic so that it assumes a bent configuration having a first radius when rotated in contact over a predetermined portion of its length with the dosable material and so that it assumes an extended configuration having a second radius when rotated so that it is not in contact over the predetermined portion of its length with the dosable material; a contact pin mounted at a distance from the shaft greater than the first radius but not greater than the second radius, so as to be contacted by the contact tongue in its extended configuration; and means for producing a signal when the contact tongue contacts the contact pin.

11 Claims, 4 Drawing Figures

LEVEL INDICATING DEVICE

BACKGROUND OF THE INVENTION

The present invention relates to a device for indicating that the level of a dosable material in a container has fallen below a predetermined required level, and more especially to such a device which comprises an element which is in contact with the dosable material and which supplies an electrical signal to an indicating device when the level of the material falls below the required level.

Among other applications, the device is suitable for use in electro-photographic copying equipment comprising containers which are filled with toner powder for replenishing a developer mixture. As is known, a latent image on a recording medium is developed in such a manner that a developer mixture, consisting of toner particles and carrier particles, is brought into contact with the electrostatic charge image on the recording medium. During the process of mixing with the carrier particles, the toner particles receive a triboelectric charge of a certain polarity. The electric field emitted by the charge image attracts the toner particles and detaches them from the carrier particles. Since this causes the developer mixture to be depleted of toner particles, toner must be added continuously to the developer mixture in order to keep the total concentration of toner in the developer mixture essentially constant. For this purpose there is a requirement for a device for sensing the actual level of the toner in the supply container. This device must promptly indicate that the toner is spent or that the actual level of the toner within the container has dropped below a certain mark so that the operating personnel will refill the container with toner. In this manner, the concentration of toner in the developer mixture is kept constant, since only this will ensure that the copying equipment will work in such a manner that the developed images are of uniform quality.

German Auslegeschrift No. 2,053,141 and corresponding British Pat. No. 1,302,687 disclose a device for determining the drop in the supply of a developer powder of an electrophotographic developing unit in a tank. In this device, operation of a signalling device indicates that the supply of developer powder is exhausted. This device is provided with a shaft which is rotatably mounted above and parallel to the bottom of the tank and a rod which is attached to the shaft by means of elastic elements parallel to and at a radial distance from it. This rod rotates with the shaft and has a blunt side which impedes penetration of the rod into the supply of developer powder. The elastic elements consist of several helical springs, the axes of which run radially out from the shaft, as long as the movement of the rod is not impeded. The distance of the rod from the shaft is increased by the elastic elements, if the supply of developer powder decreases. As soon as the distance from the shaft has reached a certain value, the signalling device is actuated. The springs hold the rod at such a distance from the shaft that the rod comes into contact with two electrical contacts if there is no longer any powder over the contacts, which causes an open signalling circuit to be closed and a lamp in this circuit to be supplied with current. The springs are sufficiently elastic so that they will be deflected when the contacts in the tank are covered with developer powder, thus causing the rod to float on the supply of powder and to slide through between the shaft and the electrical contacts without touching the latter, as long as there is sufficient developing powder in the tank.

This device is mechanically complex and requires considerable space which, though generally available in the developing tank of an electro-photographic device, is not available in the container of the toner-replenishing device. The container usually has a diameter which is only slightly larger than the diameter of the dosing brush located in the container and extends upwardly beyond the dosing brush. For this reason, the known device could not be accommodated in such a toner-replenishing device due to lack of space.

German Offenlegungsschrift No. 2,261,253 discloses a filling level-measuring device in which a sensing device, in contact with the toner particles, is movably mounted in a container and is moved, when the toner particles are at a distance from the sensing device, from a first into a second position. As a result of this movement, a drop of the level of the toner particles in the supply container below a level predetermined for the optimum operation of the copying machine is indicated. Upon rotation of this device from the first into the second position, a switch of an electrical arrangement is actuated in order to produce an electrical signal which triggers an indicating device. The sensing device consists of a bar magnet which is mounted on a rotatably mounted axle inside the storage container, and of two further bar magnets which are attached to the inner walls of the supply container. In the filled condition of the supply container, the bar magnet joined to the axle is immersed in toner and its longitudinal axis runs at approximately a right angle with respect to the longitudinal axes of the two bar magnets which are in line with each other. As soon as the supply of toner in the supply container has dropped to such an extent that the bar magnet located on the axle is freed, this bar magnet, under the influence of the magnetic field of the other two bar magnets, performs a 90° rotation and comes to rest in one plane with these two bar magnets.

Due to the use of at least three bar magnets, this known device is relatively expensive to produce. Furthermore, before refilling the supply container with toner, the bar magnet located on the axle must be returned manually into its original position, that is to say the first position, in order to ensure a fault-free indication of the actual level.

Both known devices have the common feature that they are space-consuming and expensive since they consist of several mechanical parts and do not utilize already existing elements of the dosing device.

SUMMARY OF THE INVENTION

It is one object of the present invention to provide an improved level indicating device.

It is a further object of the invention to provide such a device which is simple and utilizes mechanical operating principles.

Another object of the invention resides in providing such an improved device for indicating that the level in a container of dosable material has dropped below a predetermined required level, which device requires little space and can be constructed cost-effectively by utilizing existing parts of the dosing device.

It is also an object of the invention to provide an improved photocopy device embodying the level indicating device according to the invention to indicate the level of toner supply.

In accomplishing the foregoing objects, there has been provided in accordance with the present invention a device for indicating that the level of a dosable material has fallen below a predetermined level in a dosing container having a shaft mounted horizontally for rotation inside of the container and a dosing brush mounted on the shaft. This device comprises an elastic contact tongue radially fixed to the shaft for rotation therewith, the contact tongue being sufficiently elastic so that it assumes a bent configuration having a first radius when rotated in contact over a predetermined portion of its length with the dosable material and so that it assumes an extended configuration having a second radius when rotated so that it is not in contact over the predetermined portion of its length with the dosable material; a contact pin mounted at a distance from the shaft greater than the first radius but not greater than the second radius, so as to be contacted by the contact tongue in its extended configuration; and means for producing a signal when the contact tongue contacts the contact pin. Preferably, the first radius corresponds to the radius of the dosing brush, the length of the contact tongue is greater than the distance of the contact pin from the shaft, and the predetermined portion of the length of the contact tongue corresponds with the radius of the dosing brush.

According to a preferred embodiment, the signal producing means is an electric one wherein the contact tongue is electrically conductive, the contact pin is electrically conductive and passes through one wall of the container in an electrically insulated manner and the signal-producing means includes a flip-flop circuit connected to the contact pin.

In accordance with another aspect of the present invention, there has been provided an electrostatic copying apparatus including a container for replensishing toner to a toner-carrier mixture and a device associated with the container for indicating that the level of toner has fallen below a predetermined level in the container. The improvement comprises using the level indicating device described above.

Further objects, features and advantages of the present invention will become apparent from the detailed description of preferred embodiments which follows, when considered in light of the attached figures of drawing.

DETAILED DESCRIPTION OF PREFERRED EMBODIMENTS

According to the invention, these objects are achieved by a device of the type described initially when the element is an elastic contact tongue, which is attached to the shaft of a dosing brush for replenishing the dosable material, which projects radially from the shaft when the level in the container falls below the required level, and which contacts a contact pin once with each rotation of the dosing brush.

The invention produces the advantages of a device which is of mechanically very simple construction and which can be manufactured extremely cost-effectively, which requires little space and which can also be installed later and at low cost into replenishing devices with dosing brushes.

Figure 1:
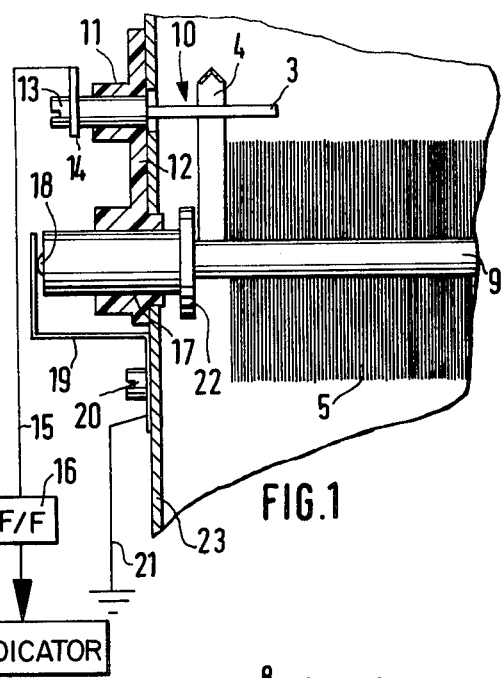
FIG. 1 is a partial cross-sectional view schematically illustrating the device according to the present invention in a dosing replenishing container for toner in a copying apparatus.

In the text which follows the invention is explained in greater detail with the aid of an illustrative embodiment illustrated in the drawing. FIG. 1 shows a partially broken-away view of the container 1 containing a dosable material 2, for example, a toner mixture for an electrostatic copying apparatus. A device for indicating that the level of the dosable material 2 in the container 1 has dropped below a predetermined required level is designated in its totality as 10 and comprises a contact pin 3, a contact tongue 4, a sliding contact 19 which rests against a bearing pivot 17 of a shaft 9 of a dosing brush 5 and is connected to ground via line 21, and a connecting lug 14 connected via line 15 to a flip-flop circuit 16 from which a signal line leads to an indicating device, which is not shown. The contact tongue 4 is made of an electrically conducting material, such as a sheet spring of brass or steel which has, for example, a thickness of approximately 0.025 mm, a width of about 5 mm and a length of about 30 mm. Instead of metal, the material used for the contact tongue can also be an elastic sheet material (e.g., of a synthetic resin) having an electrically conductive surface produced by known methods such as plating, electroplating, metal sputtering or the like.

Figure 4:
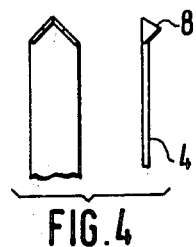
FIG. 4 is a detailed isolated view of a contact tongue of the device according to the invention.

The contact tongue 4 is attached to the shaft 9 of the dosing brush 5 for the replenishing of the dosable material 2. This can be done by soldering or crimping one end of the contact tongue 4 to the shaft 9. The free end of the contact tongue 4 is provided with angled corners 8 (FIG. 4).

At the bottom of the container 1 there is a dosing opening 7 which is closed off by a dosing screen 6. The rotations of the dosing brush 5 cause the bristles of the dosing brush 5 to transport the dosable material 2, for example toner, through the dosing screen 6 and into the supply of developer, which is not shown.

The contact pin 3 is attached to be stationary at one of the casing walls 23 of the container 1 above the dosing brush 5. In this arrangement, the distance between the contact pin and the shaft 9 of the dosing brush 5 is selected to be greater than the radius of the dosing brush 5, and in a practical example, is 25 mm if the radius of the dosing brush is 20 mm.

The container pin 3 is passed through one casing wall 23 of the container 1 in such a manner that it is electrically insulated by means of an insulating part 12 which is accommodated by a support 11 of insulating material on the outside of the casing wall 23. Connecting lug 14 is connected to the contact pin 3 by means of a screw 13. From the connecting lug 14, the line 15 leads to the flip-flop circuit 16 (also labeled F/F). Every time the contact pin 3 is contacted by the contact tongue 4, the flip-flop circuit 16 is triggered and supplies a signal to the already mentioned indicating device which is not shown in detail. When the unit is started, the flip-flop circuit 16 is in its operating state. The signal generated by the connecting lug 14 resting against the contact pin 3 resets the flip-flop circuit 16 to its initial state. In this condition, the machine control device stops the machine and simultaneously a signal lamp, which is not shown, lights up.

The shaft 9 of the dosing brush 5 merges into a bearing collar 22 of a bearing pivot 17 which passes through one casing wall 23 of the container 1 in an electrically insulated manner. On the end face of the bearing pivot 17 there is a contact area 18, for example, a part of a sphere, against which a sliding contact elastically rests. The sliding contact 19 can be a double-angled sheet spring resting with one of its angled surfaces against the outside of the casing wall 23 and attached to it by means of a screw 20. This angled surface of the sliding contact 19 is connected to ground via line 21.

Figure 2:
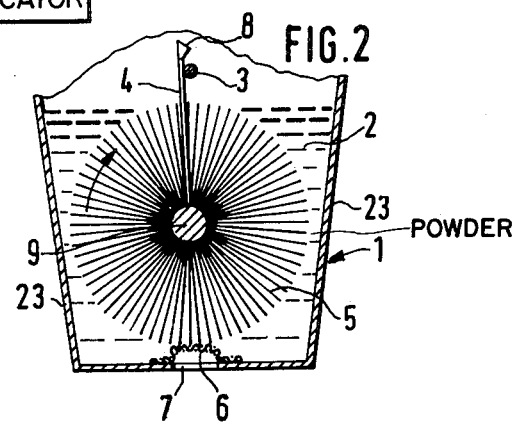
FIGS. 2 and 3 are cross-sectional side-views of the container of FIG. 1 in an empty and filled condition.
Figure 3:
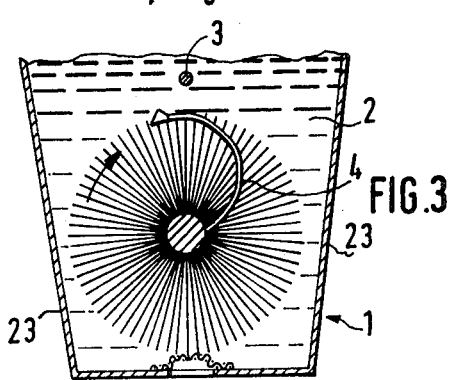

While the dosing brush 5 is covered with dosable material 2, the contact tongue 4 rests against the circumference of the dosing brush 5, as shown diagrammatically in FIG. 3. It will be apparent that this bent configuration as shown in FIG. 3 results from the drag of the dosable material 2 on the flexible tongue 4 as it is moved through the material 2 by virtue of rotation of shaft 9. If the actual level of the dosable material 2 falls to such an extent that the brush is exposed, the dosable material 2 no longer exerts a drag on the contact tongue 4 in the upper region where the brush has become exposed. The contact tongue 4 therefore rights itself with each rotation of the dosing brush 5 and in doing so contacts the contact pin 3, as shown in FIG. 2. This closes the circuit beginning with the ground connection via the sliding contact 19, the bearing pivot 17, the shaft 9, the contact tongue 4, the contact pin 3, the connecting lug 14, the line 15 and the flip-flop circuit 16 to the indicating device. The flip-flop circuit 16 thereby feeds an indicating signal to the indicating device.

As soon as the level of the dosable material 2 has dropped below the predetermined required level, the container is refilled. During the refilling of dosable material, the contact tongue 4 is pressed against the circumference of the brush for a constant period, for example, corresponding approximately to the period of half of rotation of the dosing brush 5, so that the contact between the contact tongue and the contact pin is broken during the refilling of dosable material and no indicating signal can occur with the filled container 1 when the dosing brush 5 is rotated again.

What is claimed is:

1. An electrostatic copying apparatus which includes a device for indicating that the level of a dosable material has fallen below a predetermined level in a dosing container having a shaft mounted horizontally for rotation inside of the container and a dosing brush having a radius mounted on the shaft, said level indicating device comprising:

an elastic contact tongue radially fixed to the shaft for rotation therewith, said contact tongue having an overall length which is greater than the radius of the brush, said contact tongue being sufficiently elastic so that it assumes a bent configuration under the drag of the dosable material, the bent configuration having a first radius when rotated in contact over a predetermined portion of its length with the dosable material, and so that it assumes an extended configuration having a second radius when rotated so that it is not in contact over said predetermined portion of its length with the dosable material;

a contact pin mounted at a distance from the shaft greater than said first radius but not greater than said second radius, said second radius being sufficiently large with respect to said distance at which said contact pin is mounted so that said contact pin is contacted by said contact tongue in its extended configuration, said contact pin being mounted stationary on one of the walls of the container above the dosing brush; and means for producing a signal when said contact tongue contacts said contact pin.

2. A device for indicating that the level of a dosable material has fallen below a predetermined level in a dosing container having a shaft mounted horizontally for rotation inside of the container and a dosing brush having a radius mounted on the shaft, said device comprising:

an elastic contact tongue radially fixed to the shaft for rotation therewith, said contact tongue having an overall length which is greater than the radius of the brush, said contact tongue being sufficiently elastic so that it assumes a bent configuration under the drag of the dosable material, the bent configuration having a first radius when rotated in contact over a predetermined portion of its length with the dosable material, and so that it assumes an extended configuration having a second radius when rotated so that it is not in contact over said predetermined portion of its length with the dosable material;

a contact pin mounted at a distance from the shaft greater than said first radius but not greater than said second radius, said second radius being sufficiently large with respect to said distance at which said contact pin is mounted so that said contact pin is contacted by said contact tongue in its extended configuration, said contact pin being mounted stationary on one of the walls of the container above the dosing brush; and means for producing a signal when said contact tongue contacts said contact pin.

3. A device according to claim 2, wherein said first radius corresponds to the radius of the dosing brush.

4. A device according to claim 3, wherein said predetermined portion of the length of said contact tongue corresponds with the radius of the dosing brush.

5. A device according to claim 3, wherein said contact tongue is electrically conductive, wherein said contact pin is electrically conductive and passes through one wall of the container in an electrically insulated manner and said signal producing means comprises a flip-flop circuit connected to said contact pin.

6. A device according to claim 5, wherein the shaft of the dosing brush passes in an electrically insulated manner with a bearing pivot through one wall of the container and the end face of the bearing pivot is in contact with a sliding contact which is grounded.

7. A device according to claim 6, wherein said sliding contact is angled and rests with one of its surfaces against the outside of the wall of the container.

8. A device according to claim 2, wherein the length of said contact tongue is greater than the distance of said contact pin from the shaft.

9. A device according to claim 8, wherein the free end of said contact tongue comprises portions extending in the direction of rotation.

10. A device according to claim 9, wherein said portions comprise corners of said contact tongue bent into the direction of rotation.

11. A device according to claim 10, wherein said contact tongue comprises a metallic sheet spring having a thickness of approximately 0.025 mm.

* * * * *